United States Patent [19]
Miyahara et al.

[11] Patent Number: 5,774,195
[45] Date of Patent: Jun. 30, 1998

[54] BROADCASTING SYSTEM DISCRIMINATING TELEVISION RECEIVER FOR DIFFERENTIATING BETWEEN ANALOG AND DIGITAL TELECAST SIGNALS

[75] Inventors: Yasunori Miyahara; Syun-ichi Anzai, both of Kanagawa-ken, Japan

[73] Assignee: Kabushiki Kaisha Toshiba, Kawasaki, Japan

[21] Appl. No.: 967,503

[22] Filed: Nov. 12, 1997

Related U.S. Application Data

[60] Continuation of Ser. No. 670,754, Jun. 21, 1996, abandoned, which is a division of Ser. No. 377,596, Jan. 24, 1995, Pat. No. 5,598,221.

[51] Int. Cl.$^6$ ........................................ H04N 1/00
[52] U.S. Cl. .................... 348/726; 348/731; 348/735; 348/554; 379/216; 379/321; 379/344; 455/142
[58] Field of Search .................... 348/725, 726, 348/731, 733, 735, 553–555; 379/214, 321, 344, 216; 455/142; H04N 1/00

[56] References Cited

U.S. PATENT DOCUMENTS

| | | | |
|---|---|---|---|
| 4,750,216 | 6/1988 | Hart et al. | 455/214 |
| 4,817,195 | 3/1989 | Kubo et al. | 455/192 |
| 4,855,835 | 8/1989 | Tobita | 384/735 |
| 4,979,230 | 12/1990 | Marz | 455/3 |
| 5,062,005 | 10/1991 | Kitaura et al. | 348/735 |
| 5,072,297 | 12/1991 | Kanazawa et al. | 358/143 |
| 5,163,159 | 11/1992 | Rich et al. | 455/74 |
| 5,361,099 | 11/1994 | Kim | 348/555 |
| 5,418,815 | 5/1995 | Ishikawa et al. | 375/216 |
| 5,475,442 | 12/1995 | Matsushita et al. | 348/554 |
| 5,532,762 | 7/1996 | Sakai et al. | 348/738 |

FOREIGN PATENT DOCUMENTS

| | | | |
|---|---|---|---|
| 0 574 273 A1 | 12/1993 | European Pat. Off. | H04N 5/46 |
| 2-174345 | 7/1990 | Japan | H04L 27/22 |

*Primary Examiner*—Glenton B. Burgess
*Attorney, Agent, or Firm*—Cushman Darby & Cushman IP Group of Pillsbury Madison & Sutro, LLP

[57] ABSTRACT

A broadcasting system discriminating television receiver including a circuit for evaluating the output of an FM demodulator, a circuit for evaluating the output of an I/Q wave detector, and a controller for controlling a switch based on the results of each evaluation. The switch is used primarily to determine whether the output of the receiver is analog or digital.

17 Claims, 11 Drawing Sheets

BROADCASTING SYSTEM DISCRIMINATING TELEVISION RECEIVER FOR DIFFERENTIATING BETWEEN ANALOG AND DIGITAL TELECAST SIGNALS

This is a continuation of application Ser. No. 08/670,754, filed on Jun. 21, 1996, which was abandoned upon the filing hereof, which is a Divisional of application. No. 08/377,596, filed Jan. 24, 1995 (now patented— U.S. Pat. No. 5598221).

FIELD OF THE INVENTION

This invention relates to a television receiver, and more particularly to a broadcasting system discriminating television receiver which discriminates between an analog and a digital telecasting systems. The present invention also relates to a broadcasting system discriminating television receiver which receives a digital modulating system such as multivalued PSK (Phase Shift Keying) modulation and an analog modulating system such as FM modulation.

BACKGROUND OF THE INVENTION

FIG. 1 is a block diagram showing the configuration of conventional analog and digital television (TV) receivers. The signal input from antenna 61 is distributed either to system A for receiving an analog broadcast or to system D for receiving the digital broadcast.

When analog broadcasting with an FM modulation system, a channel is chosen by selecting the signal input from antenna 61 through channel selector 62. The signal thus selected is input into FM demodulator 63 to be output as FM-demodulated signal 6a. The demodulated signal 6a is received by video processor 64 to be output as the video signal 6d.

When digital broadcasting using a multiple PSK modulating system, a broadcasting channel is chosen by selecting the signal input from antenna 61 through channel selector 65. The signal thus selected is input into I/Q wave detector 66 to be output as an I/Q-detected output signal 6c. The I/Q-detected signal 6c is received by digital demodulator 67 to be output as the analog video signal 6b, and as a video output signal.

As described, analog and digital broadcasts can be received by different television receivers in conventional systems. However, in those systems, users could not determine whether the received telecast was based on an analog or on digital signal until the video signal was transformed into the actual picture on the screen. Further those systems require users to change the telecasting system to match the signal received, even when they could identify the system. That is, in the foregoing conventional broadcasting system discriminating television receiver which distinguishes analog telecast from digital one, it was impossible to identify the telecast system before the image came out on the screen as described above. Also, once the system type was determined (analog/digital), users were compelled to change the system to match the signal received. Such a switching operation was inconvenient and time-consuming.

FIG. 2 represents another conventional television receiver system that operates with both analog and digital systems. In FIG. 2, the television signal input into the input terminal 1001 is selected by channel selector 1002 as either the IF (Intermediate Frequency) signal for either digital demodulation for digital signals received or analog demodulation for analog signals received. When a digital signal is received, the wave detector 1003 (composed of the detectors 1003a and 1003b and 90° phase shifter 1003c) detects the IF signal using the regenerative carrier signal of the regenerative carrier oscillator 1004. The IF signal thus detected is output to the digital demodulation portion in the following stage through the output terminals 1005a and 1005b.

When an analog signal is received, the IF signal is fed to wave detector 1006, where it is detected by the carrier signal of regenerative carrier oscillator, 1007, and then output at output terminal 1008. The output of terminal 1008 is a direct current voltage corresponding to the frequency of the IF signal for analog and to that of the regular IF signal. A signal corresponding to the channel select deviation of the channel selector 1002 can be obtained by supplying the output of terminal 1008 to low-pass filter 1010 through dc amplifier 1009. This output, fed back as an AFC output to channel selector 1002, contributes to enhanced accuracy of channel selection.

Such a conventional system is critically vulnerable when incorporated into an IC system. Regenerative carrier oscillator 1004 of the digital portion requires an extremely accurate phase characteristic to enable use of a phase modulation system such as multi-valued PSK. It is very difficult to design an oscillator to output a regenerative carrier signal having a high frequency signal output with good phase characteristic. It is therefore not very feasible to incorporate the above system into an integrated circuit system. Forming the system with discrete units rather than an IC design results in increases in size and manufacturing cost.

On the other hand, an AFC which acquires data on channel selection deviation at the analog portion requires regenerative carrier oscillator 1007 to generate an extremely precise oscillator frequency. The required precision renders circuit-integration difficult since some exterior adjustment must be made for dispersion in device manufacturing, reducing the yield due to the frequency drift in the oscillator. These factors render IC incorporation virtually impossible.

In another example of a conventional broadcast discriminating television receiver, where phase modulation, if any, is used for a digital modulation system, a regenerative carrier oscillator must generate a high frequency output signal having an extremely accurate phase characteristic. This factor rendered circuit-integration of the system more difficult. Moreover, the conventional AFC using the analog portion to determine the channel select deviation required a regenerative carrier oscillator that generated an extremely accurate oscillation frequency as well as some external regulation against a dispersion in the manufacturing of devices.

SUMMARY OF THE INVENTION

It is an object of the present invention to provide a broadcast system discriminating television receiver which can distinguish an analog telecast from a digital one.

Another object of the present invention is to provide a broadcasting system discriminating television receiver which can cope with both analog and digital systems, which has a regenerative carrier for digital with a good phase characteristic and a highly accurate AFC system requiring no external regulation, and which is well-suited for incorporation into integrated circuit.

In order to achieve the above objects, a first aspect of a broadcasting system discriminating television receiver according to one aspect of the present invention includes a circuit which applies the FM demodulation discrimination on the output of the FM demodulator in an analog broadcasting, or a circuit which applies a video signal discrimination on a video output which is connected to a circuit which applies an I/Q wave detection on the output of an I/Q detector or a circuit which applies a video signal discrimination on a video output, and means for controlling a signal selector switch (SW) after the channel selector judging from the result of the discriminator.

The foregoing construction enables control of the signal selector SW based on whether the signals input from the results of the respective discriminators are analog or digital. Thus, the switch transfers the signal to the FM demodulating side in the case of an analog broadcast, and transfers the signal to the I/Q wave detect side in the case of a digital broadcast, thereby permitting automatic discrimination of the broadcasting systems.

In order to achieve the above objects, a second aspect of a broadcasting system discriminating television receiver according to one aspect of the present invention includes channel selector means generating an IF signal for digital and an IF signal for analog for the demodulation of a desired channel, a first frequency variable oscillator generating the regenerative carrier signal for detection of the IF signal for digital, first wave detection means recognizing the IF signal for digital by means of the first oscillator; a second frequency variable oscillator generating the regenerative carrier signal for the IF signal for analog. second detection means uncovering the IF signal for analog by means of the output of the second oscillator; reference signal generator means which generates a signal with a frequency which is an integral submultiple of the frequency of the IF signal for digital, switch means which selectively outputs either the output of the first oscillator or the IF signal for analog (discriminating whether the output is of the first oscillator or of the second oscillator), an AFC circuit detecting the differential frequency between the input IF signal and the regular IF signal by comparing the frequency of the output of said switch means and that of the reference signal generator means, a PLL circuit detecting the phase difference between the first oscillator and an arbitrary reference signal by comparing the phase of the output of the switch means with that of the reference signal generator means and feedback means which provides the AFC circuit output to the channel selector means as a data on channel select deviation to feed the output of the PLL circuit back to the first oscillator.

According to the foregoing construction, a combined use, by the aforesaid means, of the counter of the AFC circuit and the PLL circuit contributes to the improved phase characteristic of the regenerative carrier oscillator for digital through the PLL circuit and to the improved AFC accuracy by use of logic without incurring any large expansion of the system scale.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention will be described in detail with reference to the FIGS. 3 through 11.

Figure 1:
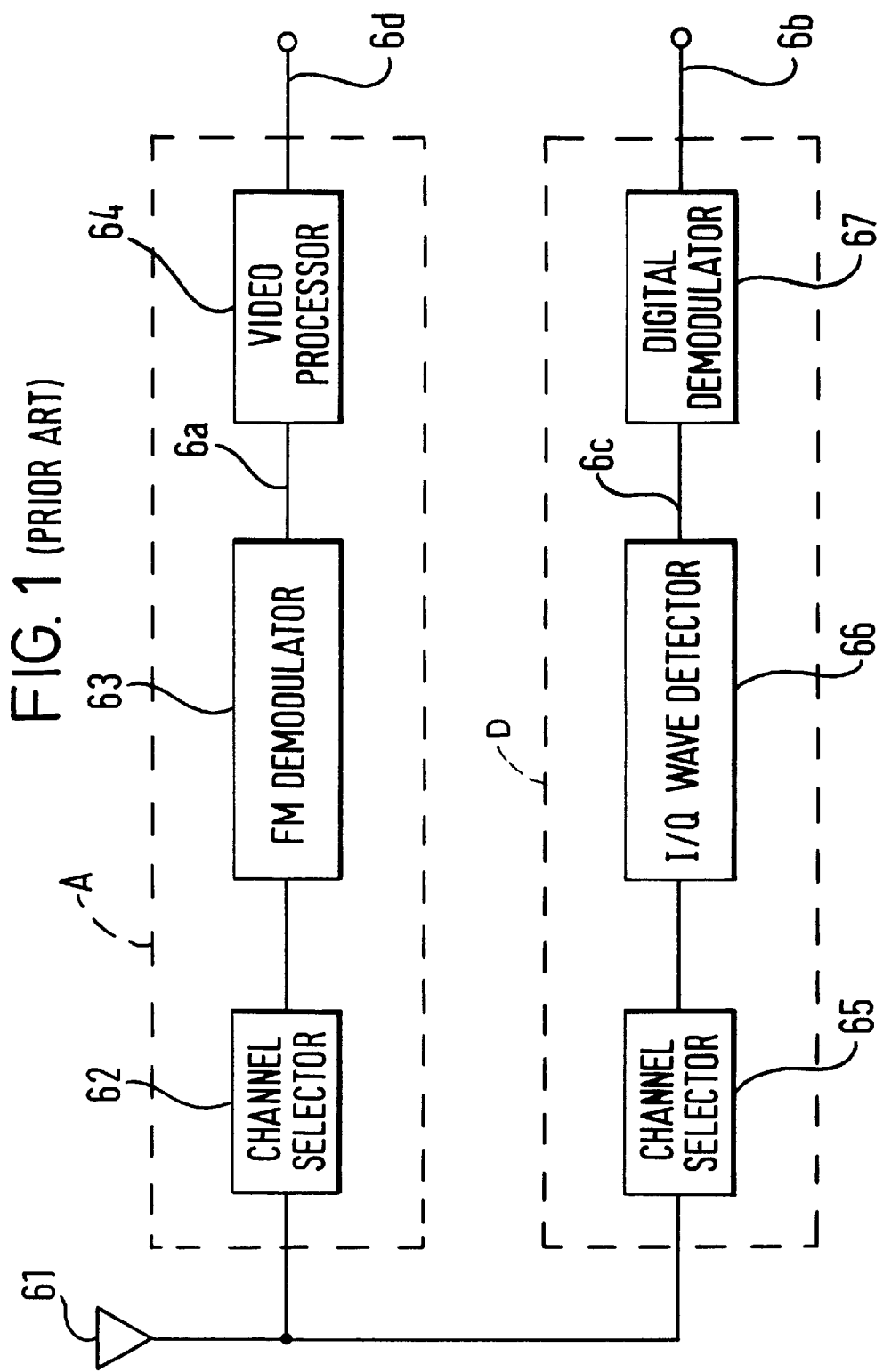
FIG. 1 is a block diagram illustrating a system configuration intended to describe how to discern, by the conventional television receiver, between analog and digital telecast systems.
Figure 2:
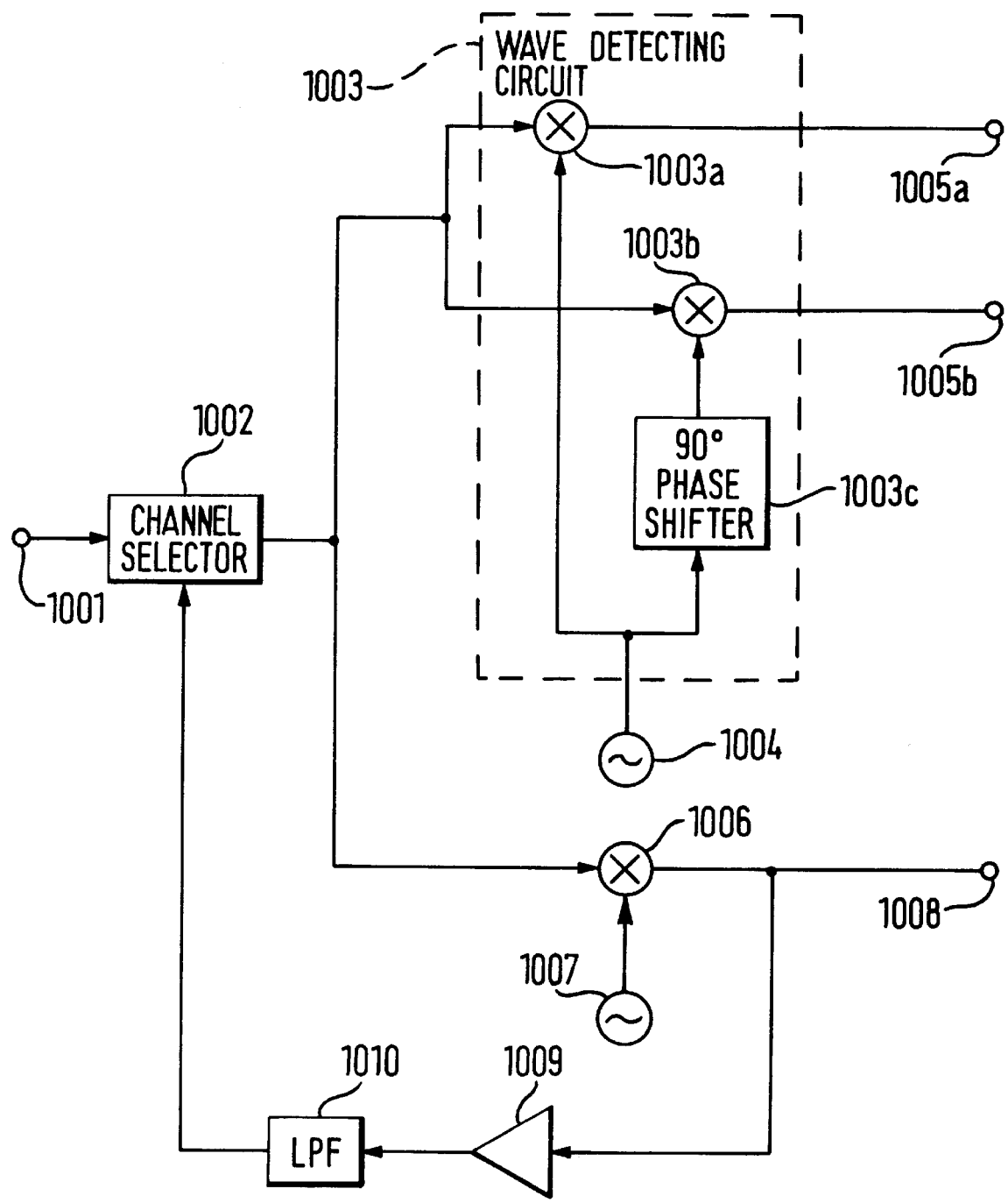
FIG. 2 is a block diagram illustrating a system configuration exhibiting another example of the television receiving set responding to both the conventional digital and analog systems.
Figure 3:
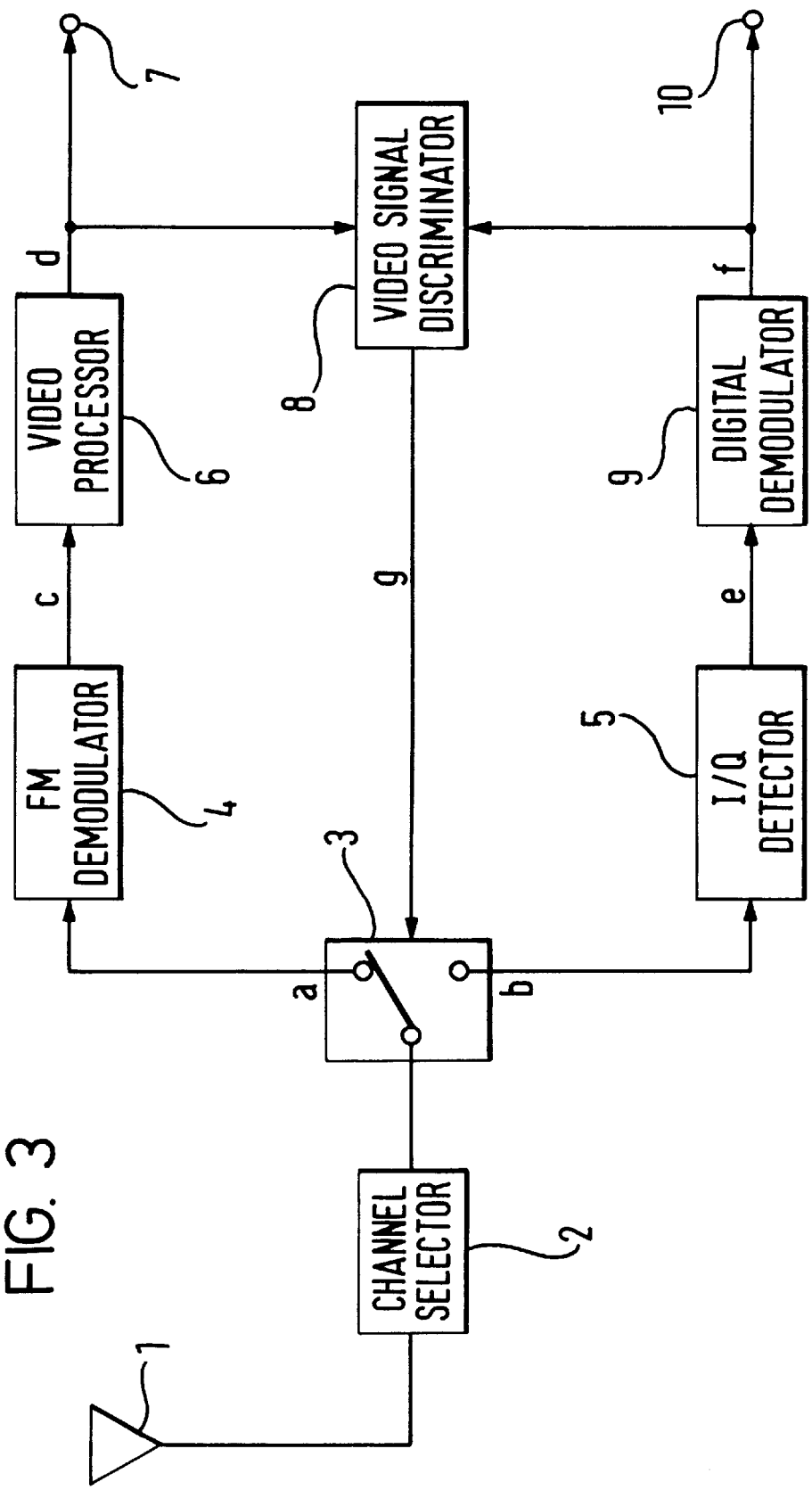
FIG. 3 is a block diagram illustrating a system configuration to explain an example of the first embodiment of the broadcasting system discriminating television receiver by this invention.

FIG. 3 represents a block diagram of a telecast receiver intended to disclose an embodiment of this invention. The signal input from the antenna 1 selects a broadcasting channel using channel selector 2. The signal thus selected is input into the broadcasting mode selector switch 3, which outputs signal "a" to the FM demodulator 4 in the case of analog broadcasting and signal "b" to the IIQ detector 5 in the case of a digital broadcasting.

In the event of the FM-modulated analog broadcasting, FM demodulator 4 receives signal a as input and generates FM-demodulated signal c as output. The demodulated signal c is applied to a video processor 6, which outputs a video signal d to the outer terminal 7 and a video discriminator 8.

When multiple PSK-modulated digital broadcasting, signal b is input into the I/Q wave detector 5, which outputs the I/Q-detected output signal c to digital demodulator 9, which outputs the analog video signal f. Analog video signal f is output as a video signal at output terminal 10, and input into the video discriminator 8.

In any television receiver configured as above, it is impossible to discern whether the input signal corresponds to analog broadcasting or digital broadcasting at the time when the signal is input into the antenna 1. It is therefore necessary to identify the signal and to control switch 3 based on signal type. For explanation, it is assumed that the switch 3 has been changed over to the analog telecast side when the signal is input.

In the exemplary event of an analog telecast under these conditions, the signal input from antenna 1 is transferred by switch 3 to FM demodulator 4 through channel selector 2. The signal becomes the video signal output d in the video processor 6. The accuracy of this video signal is discriminated by the video signal discriminator 8, which can be made up, for instance, of a circuit which determines whether there exist any well known marker pulse in the television video signal. If an analog telecast is correctly received under these circumstances, the switch 3 remains thrown to the analog broadcast side because the video signal discriminator 8 has correctly been receiving the signal.

If conversely a digital telecast is received in the same situation, no video signal is output to the output signal d of the video processor 6. Therefore, the video signal discriminator 8 will change the switch 3 to the digital telecast side, having recognized that the signal has not been correctly received. The signal coming from the channel selector 2 is then forwarded by the switch 3 to the I/Q detector 5. The signal e detected at the I/Q detector 5 is demodulated by the digital demodulator g to become a video signal f, which is supplied to the video signal discriminator 8 and simultaneously output to video output 10. If a digital telecast is duly received under these conditions, then the switch 3 remains thrown to the digital broadcasting side because the video signal discriminator 8 has been correctly receiving the signal. Since no video signal is output to the output signal f of the digital demodulator 9 when an analog telecast is received and the switch 3 is switched to a digital telecast side, the video signal discriminator 8 will change the switch 3 to analog telecast side using discriminating signal g because the signal evaluated had not been correctly received.

Thus the switch 3 can be changed automatically in response to the broadcasting system on the basis of the discriminating signal g generated at the video signal discriminator 8, that discriminating signal g being based on whether the input signal received from the antenna 1 is of analog telecast or of digital one.

Figure 4:
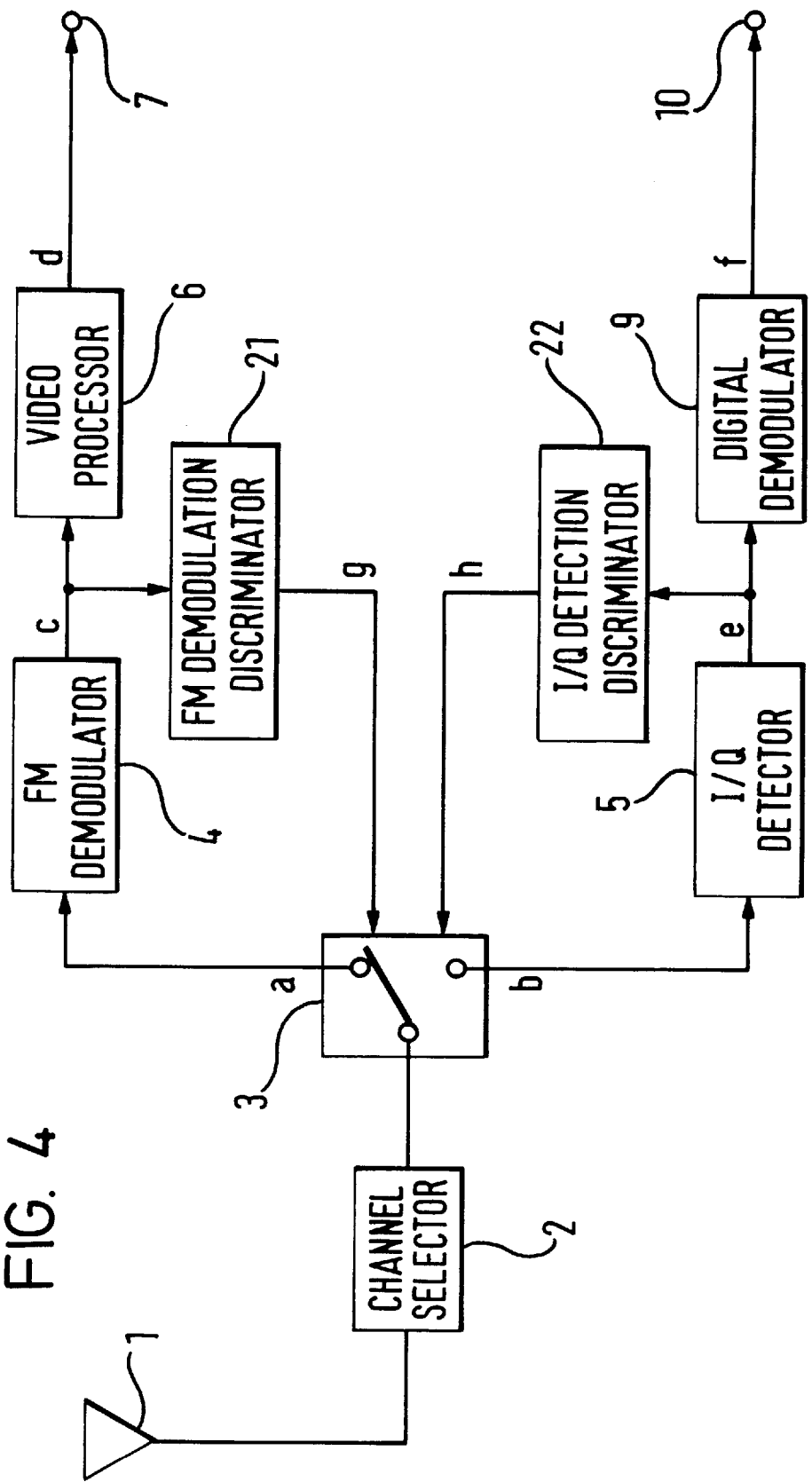
FIG. 4 is a block diagram illustrating a system configuration for explaining another example of the first embodiment of this invention.

FIG. 4 is a circuit diagram intended to illustrate another example of the first embodiment of this invention. Like characters are used in FIG. 4 to denote like parts from FIG. 3. The signal input from the antenna 1 acts to select a channel by way of the channel selector 2. In order to switch over the telecast system, this selecting signal is input into the switch 3, which generates output signal a for analog FM broadcasting and output signal b for digital broadcasting.

If the telecasting is of analog type, the output signal a is received by FM demodulator 4, which generates FM-demodulated signal c. FM-demodulated signal c is received by video processor 6 and FM demodulation discriminator 21. The signal input received by video processor 6 is used to generate video signal d at video output 7.

In the event of a digital broadcasting, the output signal b is received by I/Q wave detector 5, which generates I/Q-detected output signal e. The output signal e is received by digital demodulator 9 and I/Q wave detection discriminator 22. The signal input into the digital demodulator 9 is demodulated and then output at the video output 10 as the analog video signal f.

Figure 5A:
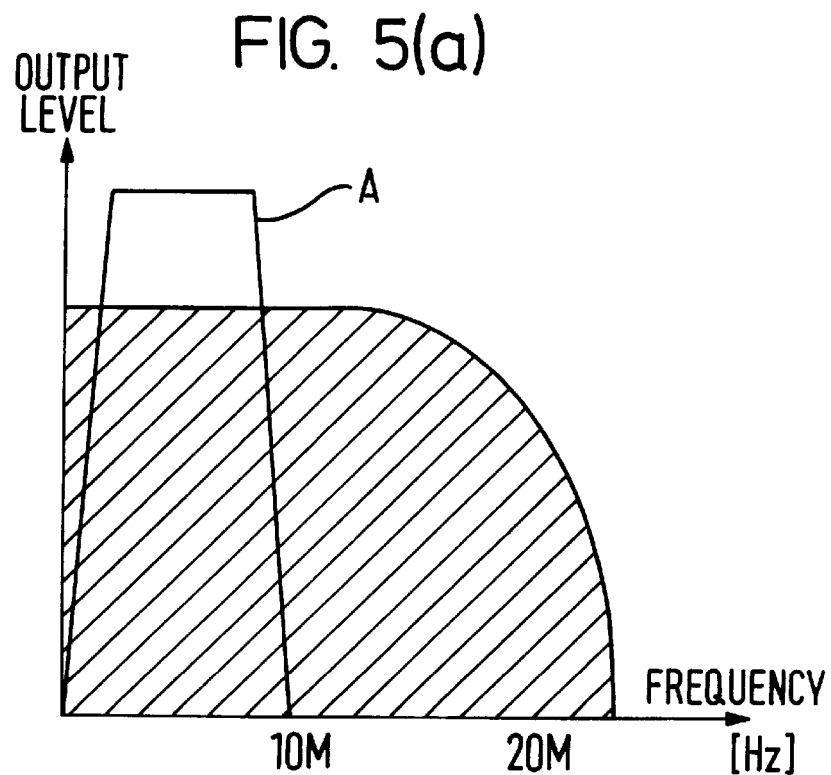
FIGS. 5(a) and 5(b) are graphs for explaining the input spectrum of the FM demodulation discriminating unit as depicted in FIG. 4.
Figure 5B:
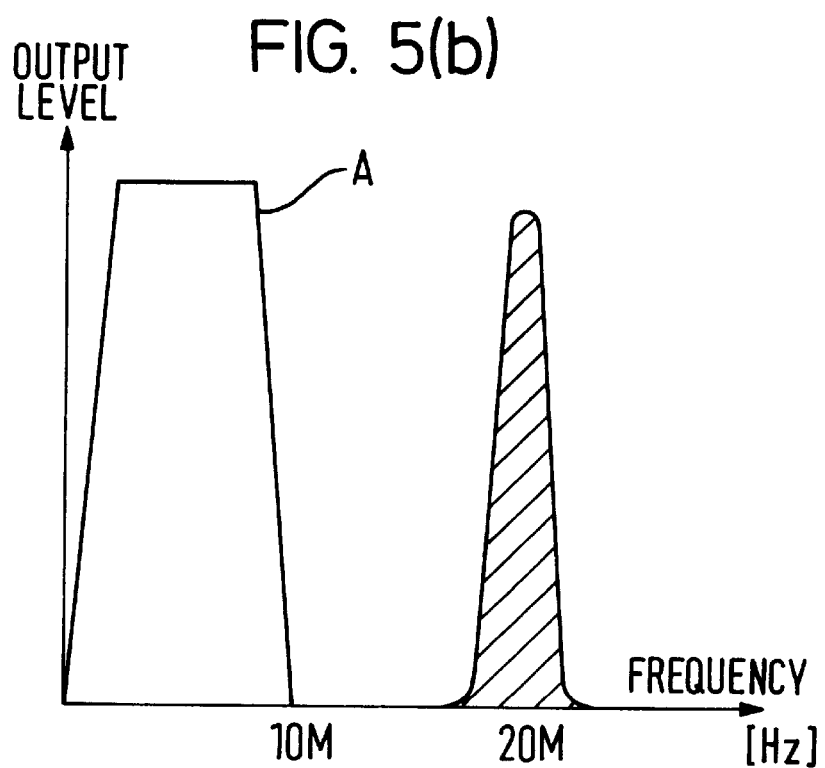

The discriminating signal g of the FM demodulation discriminator 21 and the discriminating signal h coming from the I/Q detection discriminator 22 are respectively input to switch 3 as control signals that switch the signal transfer paths. The FM demodulation discriminator 21 and the I/Q detection discriminator 22 can be discerned from each other by the characteristics of their respective signal spectrums. FIGS. 5(*a*) and 5(*a*show the input spectrum in the FM demodulation discriminator 21. FIG. 5(*a*) indicates the frequency spectrum of the analog telecast signal after the FM demodulation. Since a dispersal signal is added to disperse the spectrum in the analog FM broadcasting, a spectrum signal appears also on the low frequency side. On the other hand, FIG. 5(*a*) depicts the frequency spectrum after the multiple PSK signal in the digital telecast has been input into the FM demodulator. Since here the output signal is synchronized in phase by, for example, the FM demodulator under the demodulation system of the PLL circuit, a frequency carrier occurs on the high frequency side. It results from such features of frequency components that the FM demodulation discriminator 21 has such BPF characteristic as shown by a letter A in FIGS. 5(*a*) and 5(*b*). That is, the frequency spectrum signal can be extracted of the BPF, one of whose features is to draw out the frequency components in the low frequency area not containing any transmission carrier signal of the multiple PSK signal. If the level of this signal is high enough, the telecast can be identified as analog, and as digital if conversely the same level is low.

Figure 6A:
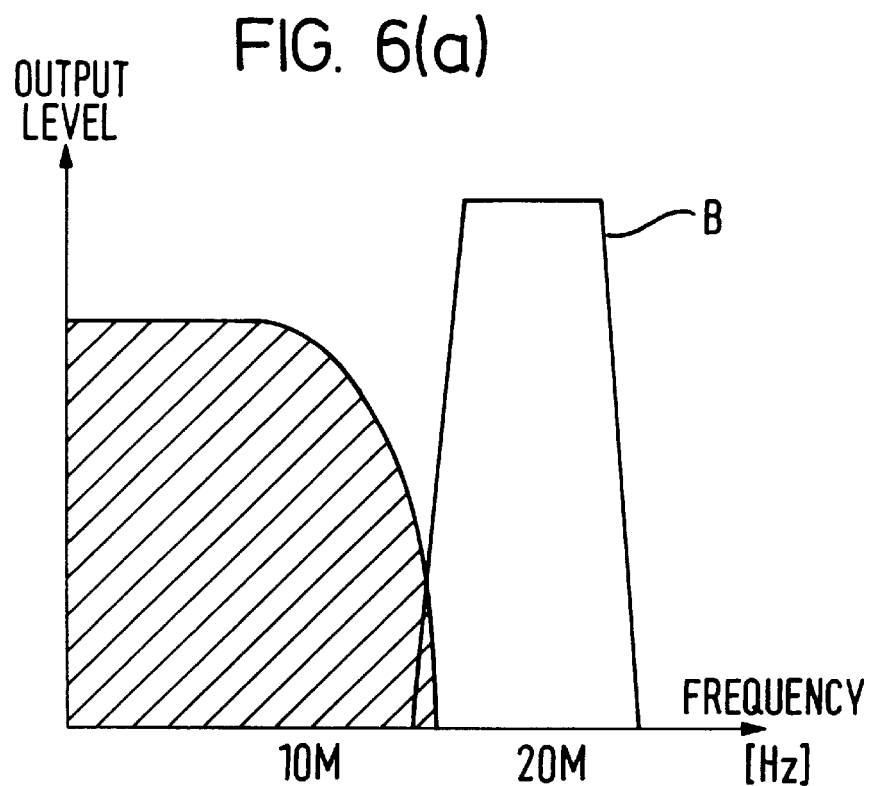
FIGS. 6(a) and 6(b) are graphs for explaining the input spectrum of the I/Q wave detection discriminating unit.
Figure 6B:
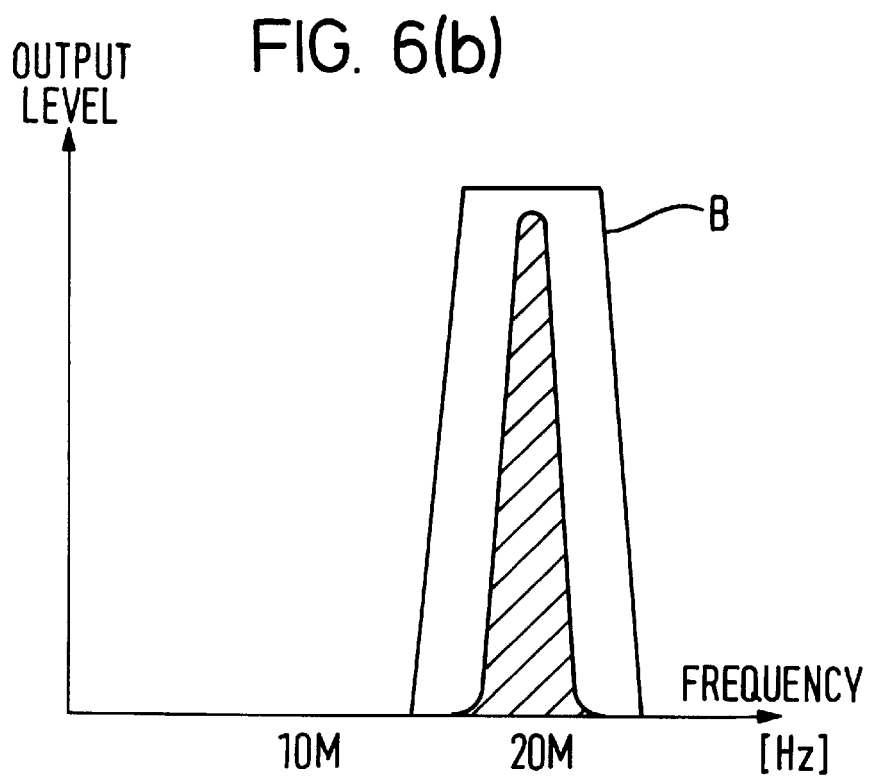

Similarly FIGS. 6(*a*) and 6(*b*) illustrate the input spectrum in the I/Q detection discriminator 22. FIG. 6(*a*) indicates the frequency spectrum of the digital telecast signal after the I/Q wave detection. Since in any digital broadcasting the multiple PSK signal is input into the I/Q detector 5 and the frequency spectrum after detection reveals the frequency output of the transmission carrier signal, the frequency carrier appears on the high frequency side. Since on the other hand, the input spectrum of the I/Q detection discriminator 22 implies that the detector makes the frequency conversion only when the analog telecast signal is input into the I/Q detector 5, the frequency spectrum concentrates on the low frequency side. From such features of the frequency components results such characteristic of the BPF in the I/Q detection discriminator 22, as shown by a letter B in FIGS. 6(*a*) and 6(*b*). In other words, the BPF characterized by the extraction of the high frequency components including the transmission carrier signal of the multiple PSK signal only extracts the frequency spectrum signal to deem the telecast as digital if the level of the signal is high enough and as analog if it is low enough.

Whether the input signal is an analog or digital broadcast cannot be estimated at the time when the signal enters the antenna 1. It is therefore necessary first to discriminate the signal by the switch 3 for the signal changeover to be commuted to either side. here we presume that the switch 3 be thrown to the analog telecast side at the time when the signal is input.

In the event of an analog broadcasting under these circumstances, the signal input from the antenna 1 passes through the channel selecting circuit 2 and is transferred to the FM demodulator 4 by the switch 3 through the channel selecting circuit 2. Whether the FM demodulation signal is correct or not is determined by way of the FM demodulation discriminator 21. When the FM demodulation discriminator 21 detects an analog frequency spectrum, it will leave the switch 3 thrown to the analog telecast side judging that the correct signal has been received.

If a digital broadcast is received under these circumstances, the switch 3 is thrown to the digital telecast side considering that the FM demodulation discriminator has not duly been receiving the signal. The signal coming from the channel selector 2 will be transferred to the I/Q detector 5 by the circuit of the switch 3. As for the signal e detected at the IQ detector 5, the switch 3 will be changed to the digital telecast side in consideration of the I/Q detection discriminator 22 judged as correctly receiving the signal.

If any analog broadcasting is received and the switch 3 remains thrown to the digital telecast side, the switch 3 will be changed automatically to the analog side estimating that the I/Q detection discriminator 22 has not duly been receiving the signal. In this example, the discrimination between analog and digital telecasts can be exerted by a simple configuration after the FM demodulator 4 and the I/Q detector 5. Because this distinction can be made in a portion nearer to the input of the television receiving system, it is possible to gain a faster identification of the broadcasting system, analog or digital.

Figure 7:
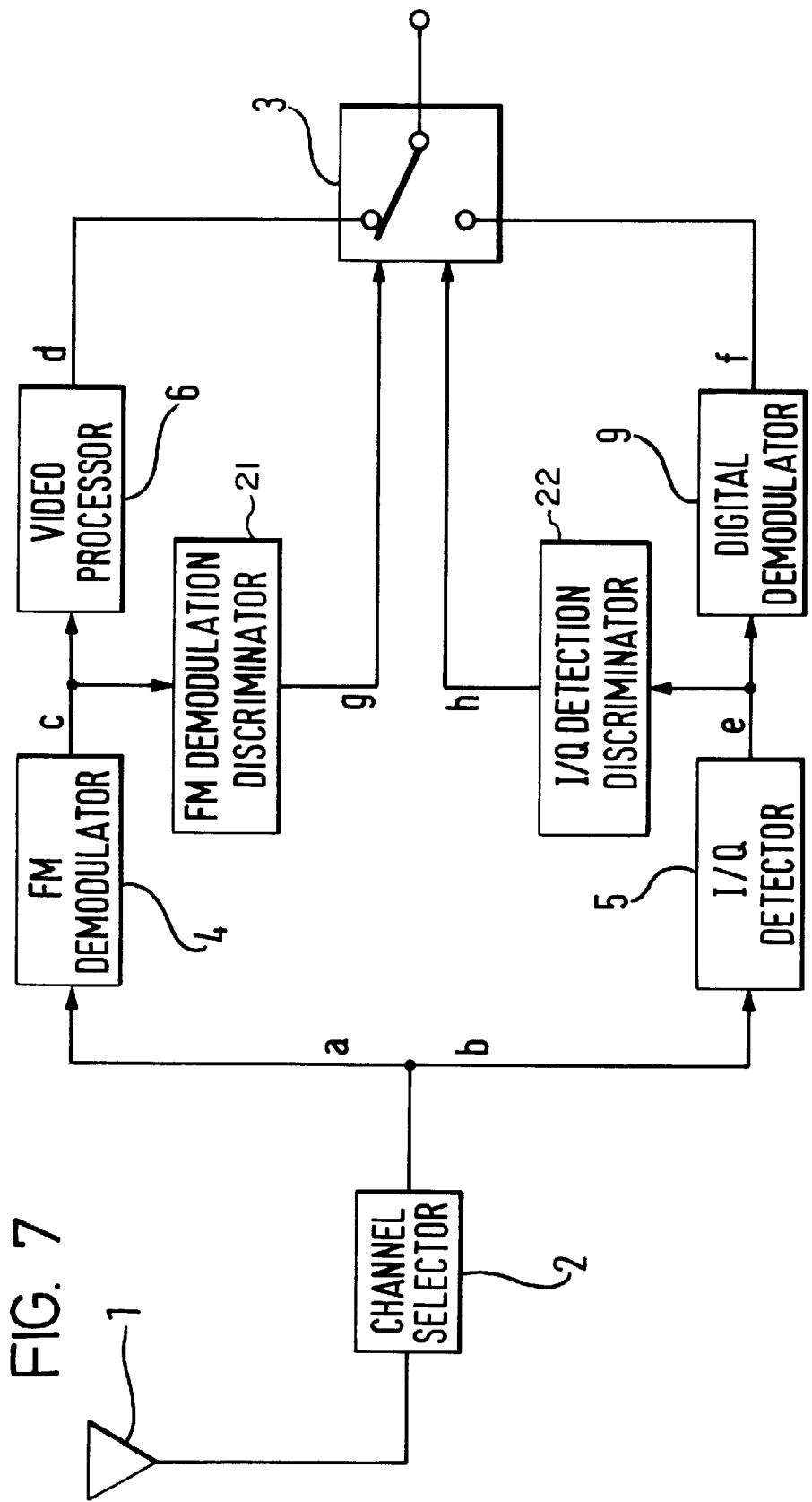
FIG. 7 is a block diagram illustrating a system configuration for explaining still another example of the second embodiment of this invention.

FIG. 7 gives a circuit diagram intended to explain another example of the first embodiment of this invention. The signal input from the antenna 1 selects the telecast by the channel selector 2. The selected signal is then input into the FM demodulator 4 and the I/Q detector 5. Out of these signals first the signal received by FM demodulator 4 is used to generate FM-demodulated signal c during an analog telecast. This demodulated signal c will be input into the video processor 6 and FM demodulation discriminator 21. The signal generated by video processor 6 is received by one of the inputs of the switch 3.

When the digital signal input is of digital telecast, the IIQ detector 5 generates I/Q detected output signal e, which is received by digital demodulator 9 and I/Q detection discriminator 22. The signal received by digital demodulator 9 is used to generate analog video signal f at the other input of the switch 3.

The output-signal g coming from the FM demodulation discriminator 21 and the output signal h from the I/Q detection discriminator 30 are respectively received by switch 3 to determine signal transfer routing.

Here both the FM demodulation discriminator 21 and the UQ detection discriminator 22 can determine if the telecast is analog or digital based on the characteristic of the signal spectrum in the system, as has been thus far described referring to FIGS. 3A and 4A.

In any television receiver of this sort of configuration, it is impossible to determine if the signal is of analog or digital type when the antenna I receives it. The signal input from the antenna 1 passes through the selector circuit 2 and arrives at the FM demodulator 4 where the FM demodulation discriminator 21 decides if the signal is a correct FM-demodulated signal. This FM demodulation discriminator 21, when it considers the signal to be correctly received, controls the switch 3 in such a fashion that a video output can be obtained from the output of the video processor 6.

If the switch 3 receives a digital telecast under these conditions, then the FM demodulation discriminator 21 will output a video signal changing the switch 3 in consideration of the signal erroneously received. The signal coming from the channel selecting circuit 2 will reach the I/Q detector 5. The signal detected at the I/Q detector 5 will hold the switch 3 thrown because the I/Q detection discriminator 22 has been correctly received the signal.

If an analog telecast is received with the switch 3 thrown to the digital telecast side, the I/Q detection discriminator 22 changes the switch 3 to the analog telecast side considering that a correct signal has not been received.

Since, in this example, the analog and digital broadcasting modes are identified after the FM demodulator 4 and the I/Q detector 5, the discrimination can be conducted at a portion of the television receiving system nearer to the input, which guarantees a faster discrimination between the analog and digital broadcasting.

Figure 8:
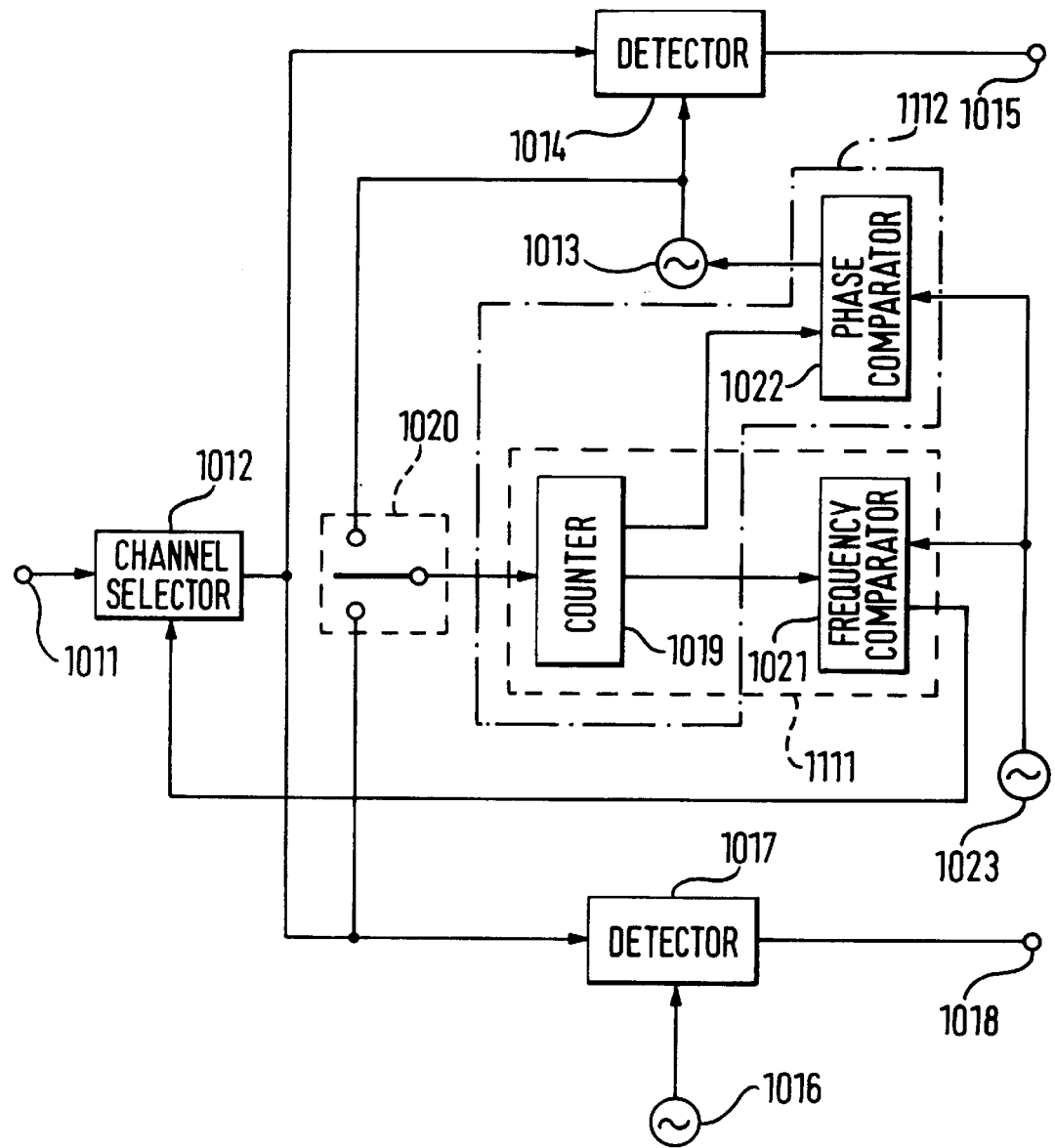
FIG. 8 is a block diagram for explaining an example of the second embodiment of this invention.

Referring now to FIGS. 8 through 11, a second embodiment of the broadcasting system discriminating television receiver according to the present invention will be described in detail. FIG. 8 is a block diagram showing a system configuration intended to illustrate the example of the second embodiment of the invention. The television transmission signal is furnished to the input terminal 1011. A desired channel is selected at the channel selecting portion 1012. Channel selector 1012 produces an IF signal for digital or analog demodulation. The IF signal and an output from the regenerating carrier oscillator 1013 are supplied to the detector 1014 to perform the wave detection so as to generate an output at the output terminal 1015. The IF signal for analog demodulation is used to generate a detection output at the output terminal 1018 when it and an output from regenerating carrier generator 1018 are operated on by detector 1017.

A switch 1020 is provided for selectively outputting the output of the regenerative carrier oscillator 1013 to the counter 1019 when receiving the digital transmission signal, and the IF signal to the counter 1019 for analog demodulation when receiving the analog transmission signal. Switch 1020 is independent of whether the selection is automatic or manual. The output of this switch 1020 is counted by counter 1019 to obtain arbitrary frequency demultiplication output that is received by frequency comparator 1021 and phase comparator 1022.

The frequency comparator 1021 compares the oscillation output of the reference oscillator 1023 to the output of the counter 1019, and generates a frequency that is an integral submultiple of the regular frequency of the IF signal for demodulation based on that comparison. The comparator provides a component AFC circuit output to the regular IF signal frequency which signifies that there is no selection error at the channel selector.

The counter 1019 and the frequency comparator 1021 constitute the AFC circuit 1111, while the counter 1019 and phase comparator 1022 constitute the PLL circuit 1112. This implies that the counter 1019 is shared by the AFC circuit 1111 and the PLL circuit 1112.

Assume that the regular IF signal frequency at the selector 1012 is 400 MHz, the reference frequency generated by reference oscillator 1023 and used for comparison is $1/128$ of the regular IF signal frequency, namely 3.125 MHz, and the demultiplication ratio of the counter 1019 is $1/128$. Assume also that the IF signal output is 403.2 MHz due to a selection error at the selector 1012. The frequency comparator 1021 compares the 3.15 MHz ($1/128$ of 403.2 MHz) from counter 1019 and switch 1020 and the reference frequency from reference oscillator 1023, 3.125 MHz. This comparison will result in the differential frequency equivalent to 0.025 MHz used to determine the AFC output equivalent to the selection error, 3.2 MHz, corresponding to an increase in frequency of 128 times.

Providing the selector 1012 with this AFC output will allow for a correction of the selection error so that an IF signal whose frequency is equal to that of the regular IF signal frequency may be generated by selector 1012.

In the phase comparator 1022, on the other hand, a phase comparison is performed between an arbitrary frequency dividing output of the counter 1019 and the output of the reference oscillator 1023. Suppose the frequency of the regenerative carrier oscillator 1013 is 400 MHz. With this portion of frequency band, we are compelled to adopt either an LC oscillator or one with variable capacitor.

The stability of the frequency and phase will degrade substantially without any PLL adopted. A phase comparison signal of, for instance, 3.15 MHz is therefore preferred. Such a signal can be obtained by the frequency dividing output of the regenerative carrier oscillator 1013, for instance ¹/₁₂₈, at the counter 1013 used in the AFC. The signal is compared in phase with the output 3.15 MHz of the reference oscillator 1023 used also in the AFC, and the PLL will be applied. If, at this stage, the reference oscillator 1023 is made up basically of the crystal oscillator which is excellent both in frequency and phase stability, then the regenerative carrier oscillator 1013 will generate a regenerative carrier signal having high frequency and phase stability.

In this example, the digital transmission with regenerative carrier signal for detection has an excellent phase characteristic, and will contribute to the enhanced conversion efficiency when demodulating. Further, the digitization of the AFC in the analog transmission and reception will allow improvements in the selection accuracy without any need to regulate.

Figure 9:
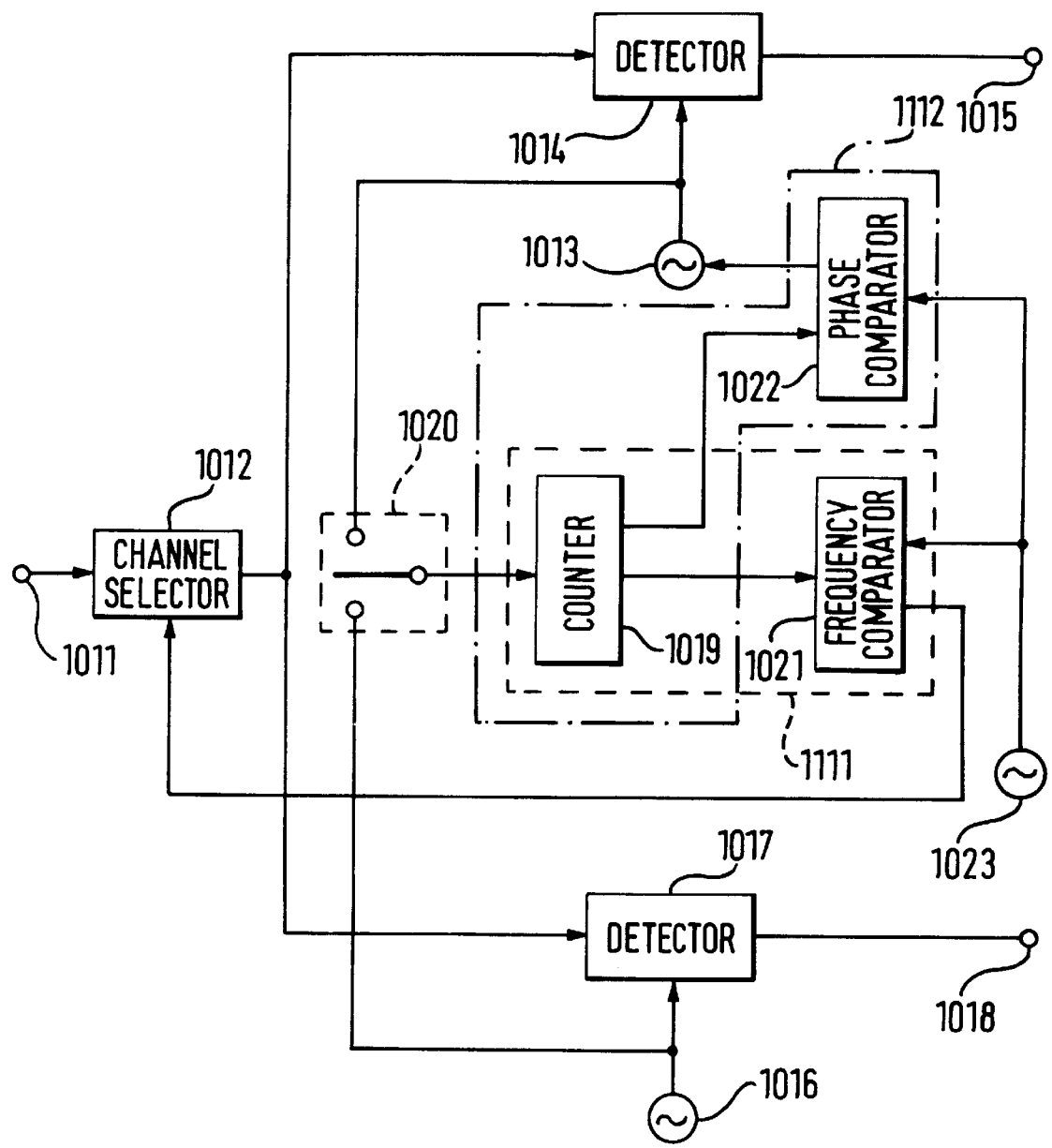
FIG. 9 is a block diagram for describing a deformed case of the example shown in FIG. 8.

FIG. 9 represents a system configuration for illustrating a change in the embodiment of the example described referring to FIG. 8. This example differs in configuration from the example depicted in FIG. 8 with regard to the regenerative carrier signal for analog demodulation. The respective outputs, such as AFC output, output a result similar to that from the example in FIG. 8. Detailed description on the operation frequency may be omitted here because the output frequency of the selector 1012 is substantially the same as the oscillation frequency of the regenerative carrier oscillator 1016.

The effect of this embodiment is similar to that of the example already explained referring to FIG. 8. However, this embodiment is advantageous in that it affords a good AFC output also at lower C/N (carrier to noise) ratio in the IF signal for analog demodulation under weak electric field. This advantage results because the utilization of the oscillation signal from the regenerative carrier oscillator 1016 can avoid any influence of noise in propagation.

Figure 10:
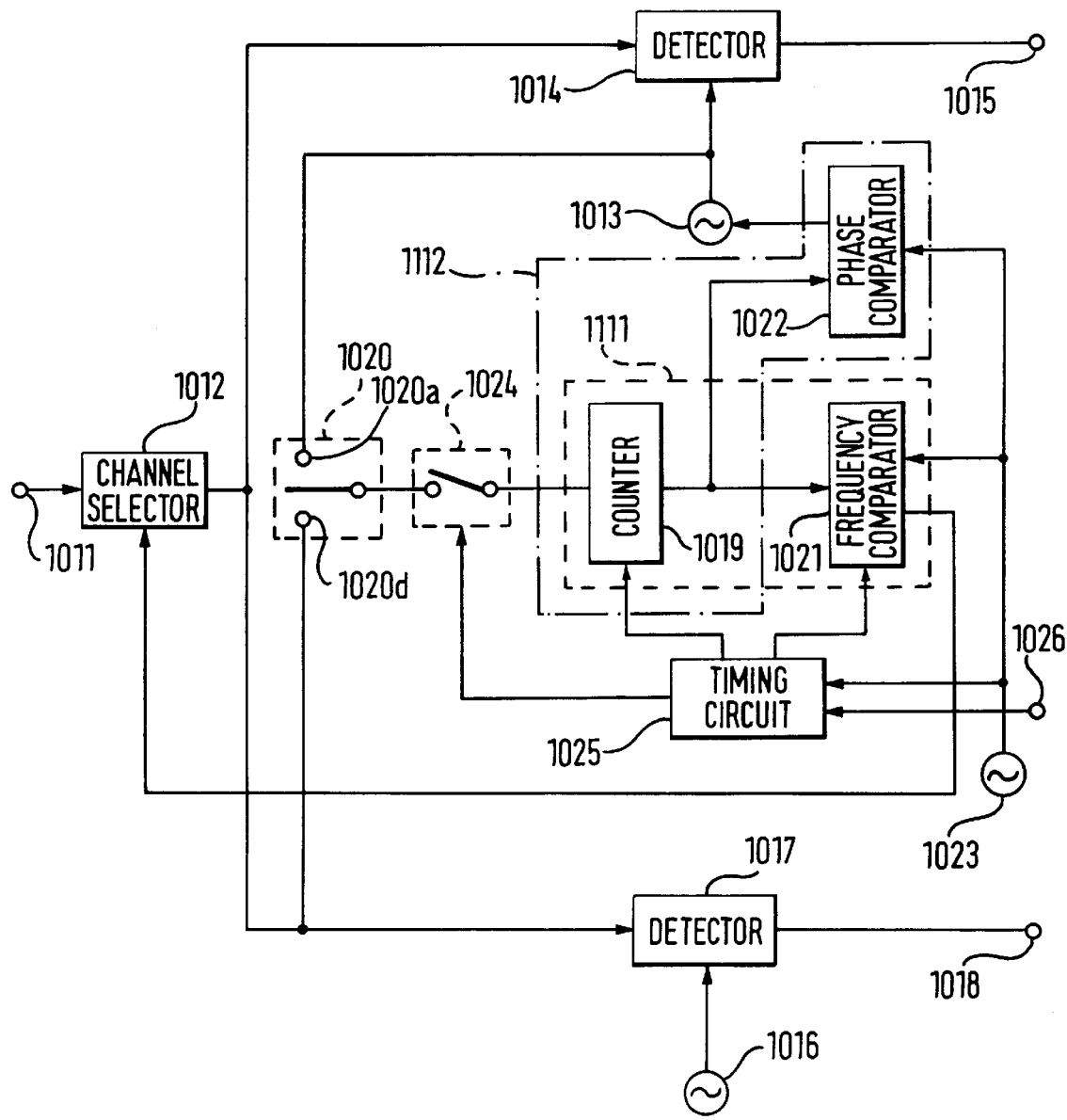
FIG. 10 is a block diagram for describing another example of the second embodiment of this invention.

FIG. 10 shows a system configuration intended to explain another example of the second embodiment of this invention. As has been the case with the example in FIG. 8, through the channel selector 1012, the IF signal for digital demodulation is forwarded to the wave detector 1014, and the IF signal for analog demodulation to the detector 1017 and to the switch 1020. To the other side of the switch 1020 given is the output of the regenerative carrier oscillator 1013 for digital demodulation, selecting the 1020a side when receiving analog signal and 1020d side when receiving digital signal. The selective output will be supplied to the switch 1024, which will be turned on and off at the timing of the ON/OFF pulses as generated at the timing circuit 1025.

Timing circuit 1025 generated pluses which turn on the switch 1024 based on the keyed AFC period input from the control terminal 1026 when simultaneously receiving the analog transmission and a transmission with keyed AFC added on any arbitrary pulses from the oscillator 1023 which generates a frequency which is an integral submultiple of the frequency of the IF signal for digital demodulation when simultaneously receiving the analog transmission and a transmission without any keyed AFC added, and whenever the digital transmission is received.

The counter 1019 receiving input from switch 1024 is incremented for any period of keyed AFC or equivalent thereto in analog transmission and reception, and holds the data thereafter. This count data will be transferred to the frequency comparator 1021 (read signal) after a given time following the termination of the counting period, and after an arbitrary time the counter 1019 will be initialized (lead signal) to wait for the next count input. The read and load signals are generated in the timing circuit 1025 by the output of the reference oscillator 1023. The frequency comparator 1021 will compare the reference count data which would be acquired at the time of the input of the regular IF signal for analog demodulation with the count data as actually gained during the foregoing count period, and generates the AFC output from the difference therebetween which is output to the channel selector 1012.

Suppose we have, at the selector 1012, a regular IF signal frequency of 400 MHz and an IF signal of 403.125 MHz from the selection error. If the keyed AFC pulse is of the mode defined as 1024 $\mu$sec, the counter 1019 will count up the IF signal during the period of 10.24 $\mu$sec, which will result in having the current value of 4128 as against the IF signal of 403.125 MHz. This value, if read into the frequency comparator 21 at the timing prior to the coming of the next portion of the keyed AFC and compared with the count value 4096 in the case where the regular IF signal frequency is counted up temporarily, will manifest quantitatively the existence of the selection error equivalent to +32 counts.

In the case of a transmission system with no keyed AFC pulse added, decoding from the output of the reference oscillator 1023 will enable a pulse equivalent to the pulse of the keyed AFC to obtain quantitatively a selection error in exactly the same way as in the case where the keyed AFC is added. If the oscillation frequency of the reference oscillator 1012 is set ¹/₁₂₈ of the IF frequency, namely 400 MHz (¹/₁₂₈ of 400 MHz=3.125), 32 clocks correspond to 10.24 $\mu$seconds.

Providing an AFC output having the selection error calculated to the channel selector 1012 will enable correction of the error.

In the event of digital transmission and reception on the other hand, the count output is the frequency dividing output of the input since the counter 1019 continues to count the output of the switch 1024. This frequency dividing output, together with the output of the reference oscillator 1023 will be fed to the pulse comparator 1022 to have a PLL output and fed back to the regenerative carrier oscillator 1013 for digital demodulation. Let the IF frequency of 400 MHz be divided by 128 by the counter 1019. Comparing in phase this signal of 3.125 MHz with the output (3.125 MHz) of the reference oscillator 1023 as used in the AFV will give a result of phase comparison for the PLL. If the PLL is made up of this result and the regenerative carrier oscillator 1013 for digital demodulation, the principle similar to that explained referring to FIG. 8 will allow to get the regenerative carrier for digital excellent in the frequency and phase stability.

Finally the outputs of the respective regenerative carrier oscillators 1013 and 1016 for digital and analog and the IF signal are fed into the respective wave detectors 1014 and 1017 to have the wave detection outputs for digital and analog.

In the present example a transmission mode with keyed AFC signal in addition to the effects of the example as have been described will bring forth an AFC output with high accuracy to improve thus the selection accuracy.

Figure 11:
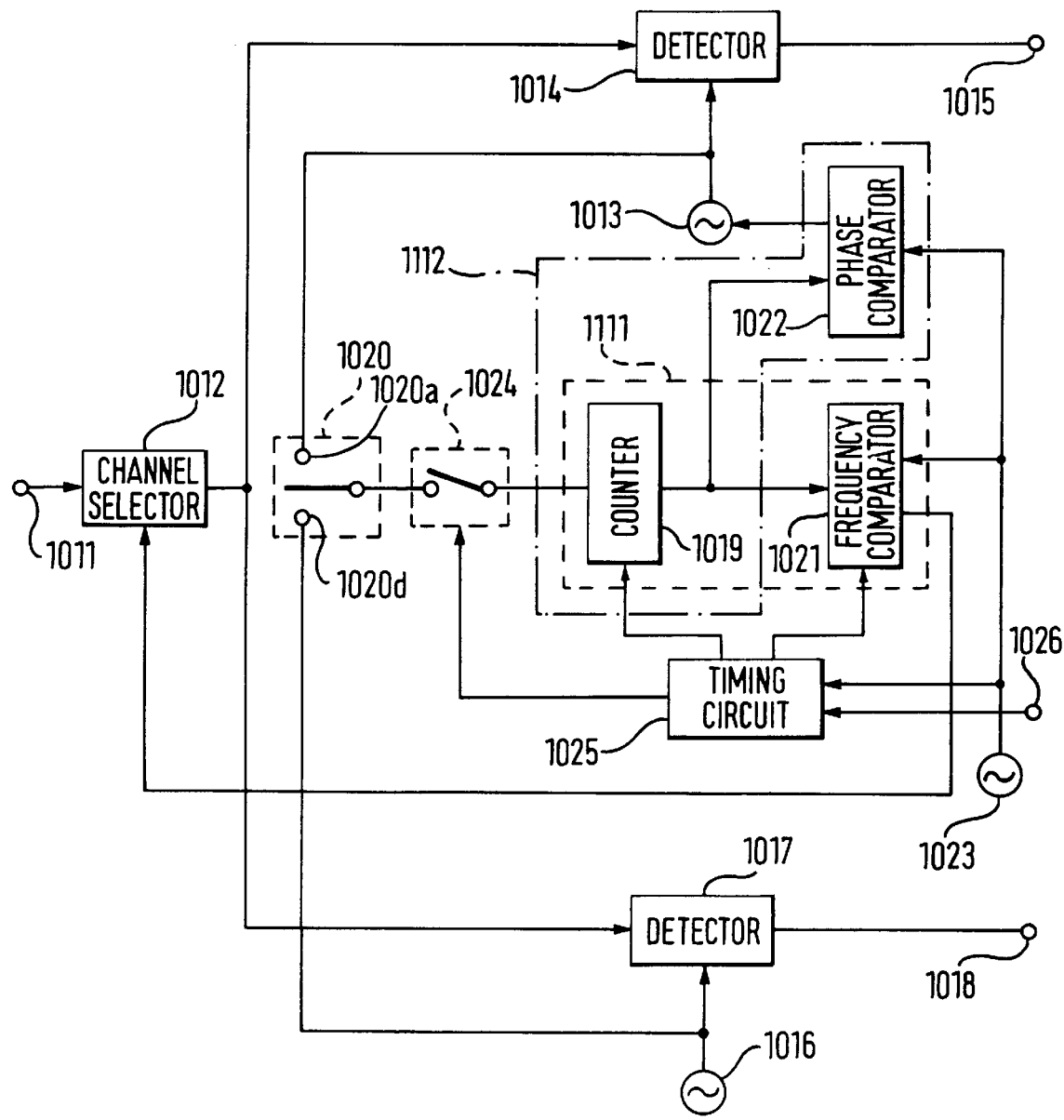
FIG. 11 is a block diagram for explaining a deformed case of the embodiment depicted in FIG. 10.

FIG. 11 illustrates a system configuration intended to describe the deformed case of the example explained referring to FIG. 10. In this example, the input into the switch 1020 in FIG. 10 is the regenerative carrier signal for analog instead of the IF signal for analog. Such respective outputs as AFC output will enable to get the result equivalent to that in the case of FIG. 10. The explanation for this case will be omitted for any other configuration are identical thereto.

In this configuration, a better AFC output than that in the example of FIG. 10 can be acquired even when receiving the IF signal for analog at a low C/N ratio and under a weak electric field, as has been the case with the example given in FIG. 9.

Making thus full use of a counter 1019 both in the AFC circuit 1111 and the PLL circuit 11 12 enables improvements of the phase characteristic of the regenerative carrier oscillator by means of the PLL, and raises the accuracy level of the AFC by using a logic without making a great expansion of the system.

As described above, the telecast system discriminating television receiver according to the first embodiment of this invention is capable of distinguishing between the analog and digital broadcasts and to commute automatically into the receiving state corresponding to each broadcasting mode.

The broadcasting system discriminating television receiving set in conformity to the second embodiment of this invention contributes to the improvement of the phase characteristic of the regenerative carrier oscillator for digital and to the enhancement of such fundamental characteristic as betterment of the channel selection accuracy. This invention therefore permits telecast system discriminating television receivers capable of receiving both digital and analog systems, as most suited to the reduction in the number of regulating points and to the integrated circuitization.

As described above, the present invention can provide an extremely preferable broadcasting system discriminating television receiver.

While there have been illustrated and described what are at present considered to the preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings were regarded by the applicant as including a variety of individually inventive concepts, some of which may lie partially or wholly outside the scope of some or all of the following claims. The fact that the applicant as chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A broadcasting system discriminating television receiver, comprising:

an FM demodulator for generating a demodulated analog broadcasting signal by demodulating a FM-modulated analog broadcast signal when received as input;

an I/Q wave detector for detecting an I/Q modulated digital broadcast signal when received as input;

an FM-demodulation discriminator generating a first output based on the demodulated analog broadcasting signal indicating whether the FM-modulated analog broadcast signal has been received as input to the FM demodulator;

a digital demodulator which demodulates the I/Q-modulated digital broadcast signal into a video signal;

an I/Q wave detection discriminator generating a second output based on the I/O modulated digital broadcast signal indicating whether the I/O demodulated digital broadcast signal has been received as input to the I/Q wave detector; and a selector selecting one of the FM demodulator and the I/Q detector to receive a next input, the selector selecting based on the first output from the FM demodulation discriminator and second output from the I/Q wave detection discriminator.

2. A broadcasting system as recited in claim 1, wherein the I/Q wave detection discriminator generates the second output based on the I/Q modulated digital broadcast signal before the I/Q modulated digital broadcast signal is demodulated.

3. A broadcasting system discriminating television receiver, comprising:

an FM demodulator for generating a demodulated analog broadcasting signal by demodulating an FM-modulated analog broadcasting signal when received as input;

a video circuit which converts the demodulated analog broadcasting signal into a first video signal;

an I/Q wave detector which detects and outputs an I/Q-modulated digital broadcasting signal;

a digital demodulator which demodulates the I/Q-modulated digital broadcast signal detected into a second video signal;

a video signal discriminator which generates a discriminated video signal based on the demodulated analog broadcasting signal from the FM demodulator and the I/Q-modulated digital broadcasting signal from the I/Q wave detector; and a selector for selecting an output from among the first video signal and the second video signal based on the discriminated video signal generated by the video signal discriminator.

4. A broadcasting system as recited in claim 3, wherein the I/Q wave detection discriminator generates the second output based on the I/Q modulated digital broadcast signal before the I/Q modulated digital broadcast signal is demodulated.

5. A broadcasting system discriminating television receiver, comprising:

channel selector which generates a digital IF signal and an analog IF signal for demodulating desired channels;

a first frequency variable oscillator which generates a first regenerative carrier signal;

a first wave detector for detecting the digital IF signal generated by the channel selector based on the first regenerative carrier signal generated by the first frequency variable oscillator;

a second frequency variable oscillator which generates a second regenerative carrier signal;

a second wave detector for detecting the analog IF signal generated by the channel selector based on the second regenerative carrier signal generated by the second frequency variable oscillator;

a reference signal generator for generating a reference signal having a frequency which is an integral submultiple of a frequency of the digital IF signal;

a switch which selectively outputs either the first regenerative carrier signal generated by the first frequency variable oscillator or the analog IF signal;

an AFC circuit which generates a first detected signal by comparing a frequency of the output of the switch means to a frequency of the reference signal generated by the reference signal generating means, the first detected signal being fed back to the channel selector; and a PLL circuit which generates a second detected signal by comparing a phase of the output of the switch means to a phase of the reference signal generated by the reference signal generator, the second detected signal being fed back into the first frequency variable oscillator.

6. A broadcasting system discriminating television receiver as claimed in claim 5, wherein the AFC circuit is comprised of a counter which counts the output of the switch and a frequency comparator for comparing a frequency of an arbitrary frequency division output generated by the counter to the frequency of the reference signal generated by the reference signal generator; and the PLL circuit includes a comparator for comparing a phase of the arbitrary frequency division output generated by the counter to the phase of the reference signal generated by the reference signal generator.

7. A broadcasting system discriminating television receiver as claimed in claim 5, wherein the AFC circuit contains a counter which counts the output of the switch means only during a first timing pulse, the counter holding the counted values until initialization by a second timing pulse, where the counted values held by the counter are read in accordance with a third timing pulse and compared to an arbitrary reference count value, and the PLL circuit contains a comparetor for comparing a phase of an arbitrary frequency division output generated by the counter and the phase of the reference signal generated by the reference signal generator.

8. A broadcasting system discriminating television receiver as claimed in claim 7, further comprising a timing pulse generator for generating the first, second and third timing pulses such that the AFC circuit compares the counted values to the arbitrary reference count value for a desired duration when analog transmission mode is selected by the switch, and such that the counter continues to count when a digital transmission mode is selected by the switch.

9. A broadcasting system discriminating television receiver as claimed in claim 5, wherein a single oscillator forms the first and second oscillators.

10. A system as recited in claim 5, wherein
the AFC circuit detects a difference in frequency between an input IF signal and a regular IF signal, and
the PLL circuit detects a phase difference between the first regenerative carrier signal and an arbitrary reference signal.

11. A system as recited in claim 5, wherein the reference signal generated by the reference signal generator is input to the AFC circuit and the PLL circuit.

12. A broadcasting system discriminating television receiver comprising:
a channel selector generating a digital IF signal and an analog IF signal for demodulating desired channels;
a first frequency variable oscillator which generates a first regenerative carrier signal;

a first wave detector for detecting the digital IF signal generated by the channel selector based on the first regenerative carrier signal generated by the first frequency variable oscillator;

a second frequency variable oscillator which generates a second regenerative carrier signal;

a second wave detector for detecting the analog IF signal generated by the channel selector based on the second regenerative carrier signal generated by the second frequency variable oscillator;

a reference signal generator for generating a reference signal having a frequency which is an integral submultiple of a frequency of the digital IF signal;

a switch which selectively outputs either the first regenerative carrier signal generated by the first frequency variable oscillator or the second regenerative carrier signal generated by the second frequency variable oscillator;

an AFC circuit which generates a first detected signal by comparing a frequency of the output of the switch means to a frequency of the reference signal generated by the reference signal generator means, the first detected signal being fed back to the channel selector;

a PLL circuit which generates a second detected signal by comparing a phase of the output of the switch means to a phase of the reference signal generated by the reference signal generator, the second detected signal being fed back into the first frequency variable oscillator.

13. A broadcasting system discriminating television receiver as claimed in claim 12, wherein the AFC circuit is comprised of a counter which counts the output of the switch and a frequency comparator for comparing a frequency of an arbitrary frequency division output generated by the counter to the frequency of the reference signal generated by the reference signal generator; and the PLL circuit includes a comparator for comparing a phase of the arbitrary frequency division output generated by the counter to the phase of the reference signal generated by the reference signal generator.

14. A broadcasting system discriminating television receiver as claimed in claim 12, wherein the AFC circuit contains a counter which counts the output of the switch means only during a first timing pulse, the counter holding the counted values until initialization by a second timing pulse, where the counted values held by the counter are read in accordance with a third timing pulse and compared to an arbitrary reference count value, and the PLL circuit contains a comparator for comparing a phase of an arbitrary frequency output generated by the counter and the phase of the reference signal generated by the reference signal generator.

15. A broadcasting system discriminating television receiver as claimed in claim 12, wherein a single oscillator forms the first and second oscillators.

16. A system as recited in claim 12, wherein
the AFC circuit detects a difference in frequency between an input IF signal and a regular IF signal, and
the PLL circuit detects a phase difference between the first regenerative carrier signal and an arbitrary reference signal.

17. A system as recited in claim 12, wherein the reference signal generated by the reference signal generator is input to the AFC circuit and the PLL circuit.

* * * * *